US008585144B2

(12) United States Patent
Huttenhuis

(10) Patent No.: US 8,585,144 B2
(45) Date of Patent: Nov. 19, 2013

(54) PIVOTABLE SEAT

(75) Inventor: Alouisius Gerardus Huttenhuis, Denekamp (NL)

(73) Assignee: PR Sella B.V., Oldenzaal (NL)

( * ) Notice: Subject to any disclaimer, the term of this patent is extended or adjusted under 35 U.S.C. 154(b) by 0 days.

(21) Appl. No.: 12/810,752

(22) PCT Filed: Dec. 30, 2008

(86) PCT No.: PCT/NL2008/050861
§ 371 (c)(1), (2), (4) Date: Jul. 30, 2010

(87) PCT Pub. No.: WO2009/084962
PCT Pub. Date: Jul. 9, 2009

(65) Prior Publication Data

US 2010/0289310 A1 Nov. 18, 2010

(30) Foreign Application Priority Data

Dec. 31, 2007 (NL) ...................................... 2001147

(51) Int. Cl.
*B60N 2/02* (2006.01)
*A47C 1/022* (2006.01)
*A47C 7/62* (2006.01)
*A47C 7/50* (2006.01)

(52) U.S. Cl.
USPC ... 297/312; 297/313; 297/217.2; 297/423.26; 297/452.23; 297/452.47

(58) Field of Classification Search
USPC ......... 297/313, 258.1, 217.2, 452.47, 180.14, 297/200, 199, 201, 452.46, 215.12, 215.11; 472/106; 104/80
See application file for complete search history.

(56) References Cited

U.S. PATENT DOCUMENTS

| | | | | | |
|---|---|---|---|---|---|
| 582,144 | A | * | 5/1897 | Moore | 297/312 |
| 604,347 | A | * | 5/1898 | Bray | 297/201 |
| 2,482,996 | A | * | 9/1949 | Wisby | 297/312 |
| 2,799,323 | A | * | 7/1957 | Berg | 297/312 |
| 3,749,442 | A | * | 7/1973 | Berg et al. | 297/312 |
| 4,475,770 | A | * | 10/1984 | Persons, II | 297/353 |
| 4,541,668 | A | * | 9/1985 | Rouw | 297/201 |
| 5,024,485 | A | | 6/1991 | Berg et al. | |
| 5,255,957 | A | * | 10/1993 | Opsvik et al. | 297/423.12 |

(Continued)

FOREIGN PATENT DOCUMENTS

| | | | | |
|---|---|---|---|---|
| EP | 91016 | A2 | * | 10/1983 |
| EP | 353201 | A | * | 1/1990 |

(Continued)

*Primary Examiner* — Milton Nelson, Jr.
(74) *Attorney, Agent, or Firm* — Morgan, Lewis & Bockius LLP

(57) ABSTRACT

A seat for supporting the bottom area of a seated person, which seat is intended and adapted to form part of an article of seating furniture, such as a chair or a couch, a seat for a means of transport such as a car, a bus or an aircraft, or a wheelchair, has the feature that the seat consists of two parts, i.e. a left-hand seat part and a right-hand seat part, which seat parts are separated from each other along the nominal median plane of a user, each of the seat parts is pivotable around a pivot zone extending at least roughly perpendicularly of said median plane; and the projected position of the pivot zone lies in front of the tubera.

15 Claims, 8 Drawing Sheets

(56) References Cited

U.S. PATENT DOCUMENTS

| | | | | | |
|---|---|---|---|---|---|
| 5,286,089 | A * | 2/1994 | Goldman | | 297/452.26 |
| 5,288,127 | A | 2/1994 | Berg et al. | | |
| 5,356,205 | A * | 10/1994 | Calvert et al. | | 297/452.41 |
| 5,564,784 | A * | 10/1996 | Felling | | 297/344.23 |
| 5,580,128 | A | 12/1996 | Johnson et al. | | |
| 5,725,274 | A * | 3/1998 | Bergmeister | | 297/201 |
| 5,913,568 | A * | 6/1999 | Brightbill et al. | | 297/258.1 |
| 6,402,235 | B1 * | 6/2002 | Letendre | | 297/195.1 |
| 7,350,865 | B2 * | 4/2008 | Pearse | | 297/312 |
| 7,387,339 | B2 * | 6/2008 | Bykov et al. | | 297/312 |
| 2003/0067195 | A1 * | 4/2003 | Sylvester | | 297/201 |
| 2005/0116527 | A1 | 6/2005 | Leguen et al. | | |
| 2008/0054689 | A1 * | 3/2008 | Tucker | | 297/201 |

FOREIGN PATENT DOCUMENTS

| | | | |
|---|---|---|---|
| EP | 1486140 | A | 12/2004 |
| GB | 2121740 | A * | 1/1984 |
| WO | WO 95/15101 | A1 | 6/1995 |
| WO | WO 03/063650 | A | 8/2003 |
| WO | WO 2005/116527 | A1 | 12/2005 |

* cited by examiner

PIVOTABLE SEAT

CROSS-REFERENCES TO RELATED APPLICATIONS

This application is a National Stage application of International Patent Application No. PCT/NL2008/050861 filed Dec. 30, 2008 and published as International Publication No. WO 2009/084962 A1 on Jul. 9, 2009, which claims priority to Netherlands Patent Application No. NL2001147 filed Dec. 31, 2007, the entire contents of applications is incorporated herein by this reference.

BACKGROUND AND SUMMARY OF INVENTION

The invention relates to a seat for supporting the bottom area of a seated person, which seat is intended and adapted to form part of an article of seating furniture, such as a chair or a couch, a seat for a means of transport such as a car, a bus or an aircraft, or a wheelchair.

Such a seat is known in many embodiments and is usually applied in combination with a backrest.

The invention has for its object to embody a known seat such that the shear forces on the upper legs and buttocks are reduced and the pressure on the left and right tubera is decreased.

As a result of a non-uniform pressure distribution on the bottom area there occurs more load at some locations on this bottom area and less load at other locations. Seated persons who are more or less forced to sit for long periods hereby experience problems related to this sitting.

Sitting-related problems manifest themselves in, among other ways, pain in the bottom area, this sometimes even resulting in death of tissue or decubitus. Decubitus is the death of tissue due to poor blood circulation. The poor blood circulation is caused, among other reasons, by the fact that a relatively high pressure locally on and in the tissue reduces the flow through the blood vessels. Decubitus ulcers occur at those locations where bone structures lie close to the surface of the skin, such as in the case of the two left and right seat bones (tubera ischiadica) and the tail bone (os coccyx).

Unfortunately, existing products such as special cushions, so-called anti-decubitus cushions, still provide little or no improvement for such patients.

The invention has for its object to provide a solution for people affected by sitting problems, including decubitus.

The invention is based on the insight that a uniform load provides for a lower peak load, which in turn ensures less discomfort.

The seat according to the invention has for this purpose the feature that the seat consists of two parts, i.e. a left-hand seat part and a right-hand seat part, which seat parts are separated from each other along the nominal median plane of a user, each of the seat parts is pivotable around a pivot zone extending at least roughly perpendicularly of said median plane; and the projected position of the pivot zone lies in front of the tubera.

The seat according to the invention ensures that the upper legs and buttocks on the left and right are supported individually in uniform manner in accordance with a natural balance. The left-hand seat part and the right-hand seat part are each supported for individual pivoting by a pivot construction. This can for instance be a single pivot shaft shared by both seat parts, although other pivot constructions can also be used, for instance rod mechanisms or the like. It is not possible in the case of such mechanisms to refer to a single pivot axis, but there is a region around which the pivoting movement takes place. This region is referred to in this specification as "pivot zone".

The description of the accompanying figures is now anticipated in the following.

The biomechanical model (FIG. 3*b*) of the seated human body assumed in the research by dr. ir. H. A. M. Staarink (page 31 of the book "Zo zit het!" ISBN 978 90 232 4341) teaches that a frictionless bottom area support is created at a seat angle $\phi$ of a minimum of 12° (FIG. 4). The position of the pivot shaft or pivot shafts respectively pivot zone or pivot zones is important for the distribution of the forces on the bottom area of the seated person. The seat angle $\phi$ is important in minimizing friction and shear forces. A support with low friction and shear forces is desirable. This can only be achieved with a correct choice of the seat angle.

A uniform load has a positive effect on the pressure-distributing properties of the seat. The seat parts can be freely movable and have for instance a rest position in which the front side of each of the seat parts occupies a highest position and the rear side a lowest position. Such a rest position can for instance be realized with suitable spring means. Use can also be made for this purpose of a specific location of the mass centre of the upper body of the seated person relative to each seat part.

According to an important aspect of the invention, the seat has the special feature that an angle measuring device is added to each of the seat parts with which the pivot positions of the seat parts can be measured and read, for instance a spirit level.

The seat can further be provided with pivot position adjusting means for adjusting the pivot positions of the seat parts.

According to yet another aspect of the invention, the seat has the special feature that the pivot position adjusting means are of mechanical, pneumatic or electrical type. Use can for instance be made of an electrical actuator.

The two latter variants have the advantage that they can be provided with fixation means for fixing at least one of the two seat parts, preferably both seat parts, in an adjusted pivot position.

In order to realize the best possible pressure distribution, the seat according to the invention can advantageously have the special feature that both seat parts have an anatomical form.

According to an important aspect of the invention, which also aims at a good pressure distribution, the seat has the special feature that both seat parts are provided with a pressure-distributing upper layer.

A further improvement in a uniform pressure distribution and an improvement in the sitting comfort is realized with an embodiment in which the pressure-distributing upper layer is air-permeable, is covered by a cover layer provided with perforations, and air pressure means, for instance fan means, are present which feed air under a certain pressure to the pressure-distributing upper layer, this air leaving the upper layer via the perforations present in the cover layer. This embodiment has the further advantage of realizing a certain ventilation and cooling of the skin and the tissues thereunder.

According to yet another aspect of the invention, the seat can comprise: control means for controlling the pivot position adjusting means such that the pivot positions of the seat parts vary through time such that the pressure loads on the tubera vary through time.

It can be of great importance that the left-hand seat part can be adjusted independently of the right-hand seat part. A difference in lower leg length or differences in thickness of for instance shoe soles on the left and right adversely affect the pressure-distributing results in the case where the seat, other than in the invention, were not divided.

In the case a footrest is set too high (FIG. 3*c*) the upper leg will be supported less, or even not be supported, and the buttock must absorb the sitting load, whereby the danger of decubitus will increase. If the footrest is adjusted too low (FIG. 3*a*) the upper leg, and particularly the part behind the knee, is loaded too much, resulting in an increased risk of restriction of blood vessels and nerve-paths, with all the adverse consequences this entails. The invention evens out the possible difference between left and right almost completely, and therefore causes considerably less high sitting load peaks (FIG. 3*b*). The pivoting of the seat parts (FIG. 6) is essential in providing a correct support and guaranteeing a balanced pressure distribution. The operation of the seat parts could be compared to the operation of a pair of scales.

Adjustment of the seat angles ($\phi_L$ (left) and ($\phi_R$ (right) (see FIG. 6) is brought about by adjusting the heights of the left and right-hand footrests. Integrated seat angle measuring devices measure the ($\phi_L$ and the ($\phi_R$ relative to the horizontal plane and give qualitative and/or quantitative feedback to the seated person and/or to the therapist.

Many seat cushions are known which claim to cause no friction or shear forces but, if there is no relation between a seat cushion and the seat angle ($\phi$) and the functional backrest angle ($\alpha+\phi$) (see figure A), friction and shear forces cannot be precluded.

During use the seat according to the invention forms part of a full seat support comprising the seat and a backrest, and optionally a footrest.

The seat according to the invention can be applied as replacement for an existing seat or be applied integrally in combination with a back support in for instance a car seat, office chair, garden seat or a wheelchair.

Seat which may or may not be embodied with a backrest are per se known. Also known are seats which can pivot in different ways.

Described in WO-A-1995/015101 is a total seat support comprising a seat wherein the seat can pivot as a whole. A similar structure is specified in WO-A-2005/0116527, although here the seat cannot pivot around a fixed pivot axis.

Described in U.S. Pat. No. 5,580,128 is a segmented seat wherein there are two pivot axes transversely of said median plane.

It is known from the literature that discomfort is also caused by friction forces on and shear forces in the tissue. Different researchers assume that the influence of friction and shear forces on discomfort, as manifested for instance in decubitus, could be greater than the influence resulting from perpendicular load. Friction and shear forces are caused largely by an incorrect value of the seat angle $\phi$.

Research has shown that an anatomically correct torso support starts at a functional backrest angle ($\alpha+\phi$) of about 115° (figure A) and ends at an angle of about 123°. At a larger angle ($\alpha+\phi$) the head must always be actively supported, and this is therefore no longer an active sitting posture, but the beginning of the lying posture.

If in the model of the human body of FIG. 5*a* masses are assigned in accordance with anthropometric data to the body parts assumed in the model, it then follows from a (bio) mechanical analysis that, at a functional backrest angle of ($\alpha+\phi$) of 115° and a seat angle $\phi$ of about 12°, no friction forces occur on the bottom area as a result of the external load.

If the seat angle ($\alpha+\phi$) increases, angle $\phi$ must also increase in order that no shear forces are caused in the seat as a result of the external load. There is a direct relation between a seat angle ($\alpha+\phi$) and seat angle $\phi$. If both seat parts are provided with an angle indicator, the measured angles $\phi_L$ and $\phi_R$ are indicators of whether or not friction and shear forces occur on the seat parts.

It is important to stimulate awareness of posture through interaction of the seat and the user by means of said angle indicators added to both the left and the right-hand seat part. The user and/or the therapist can check the seat angle by reading the value of $\phi_L$ and $\phi_R$ from the integrated angle indicators.

People with sitting problems are often consciously involved in their rehabilitation. In order to stimulate this process the invention provides users, by means of the seat angle indicator, with an aid allowing them to monitor their own sitting posture and, if necessary, to adjust it themselves if possible.

The seat does not require an actuator to position a user in the correct posture because the user balances him/herself using the balance in the support, provided the footrest is set to the correct height.

An actuator can however be added for a forced alternating load between the left, right, front and rear sides of the seat. This provides the option of varying the load on both tubera (FIG. 7).

By tilting the left-hand supporting surface further forward (reducing angle $\phi_L$) the left tuber will be loaded more than the right tuber. By varying the left and right seat angle (respectively $\phi_L$ and $\phi_R$) the loads on the tubera will begin to vary, this enhancing flow of blood and moisture in the surrounding tissue. The risk of decubitus can thus be reduced in preventive manner.

The transfer, i.e. sitting down in or standing up from the seat, is facilitated in that the seat parts pivot along with the displacement of the centre of gravity of the user.

In addition to posture and pressure distribution, temperature and moisture are also important factors in the development of decubitus or discomfort. In the invention the seat contact surfaces are provided with a cover and a pressure-distributing layer which are air and moisture-permeable so as to bring about a decrease in the air humidity and temperature on the seat surface, optionally brought about by a forced airflow. FIG. 8 makes clear that forced ventilation in the pressure-distributing layers of the support is realized by means of an electrically driven fan.

BRIEF DESCRIPTION OF THE DRAWINGS

The invention will now be elucidated with reference to the accompanying drawings. In the drawings.

DETAILED DESCRIPTION

Figure 1:
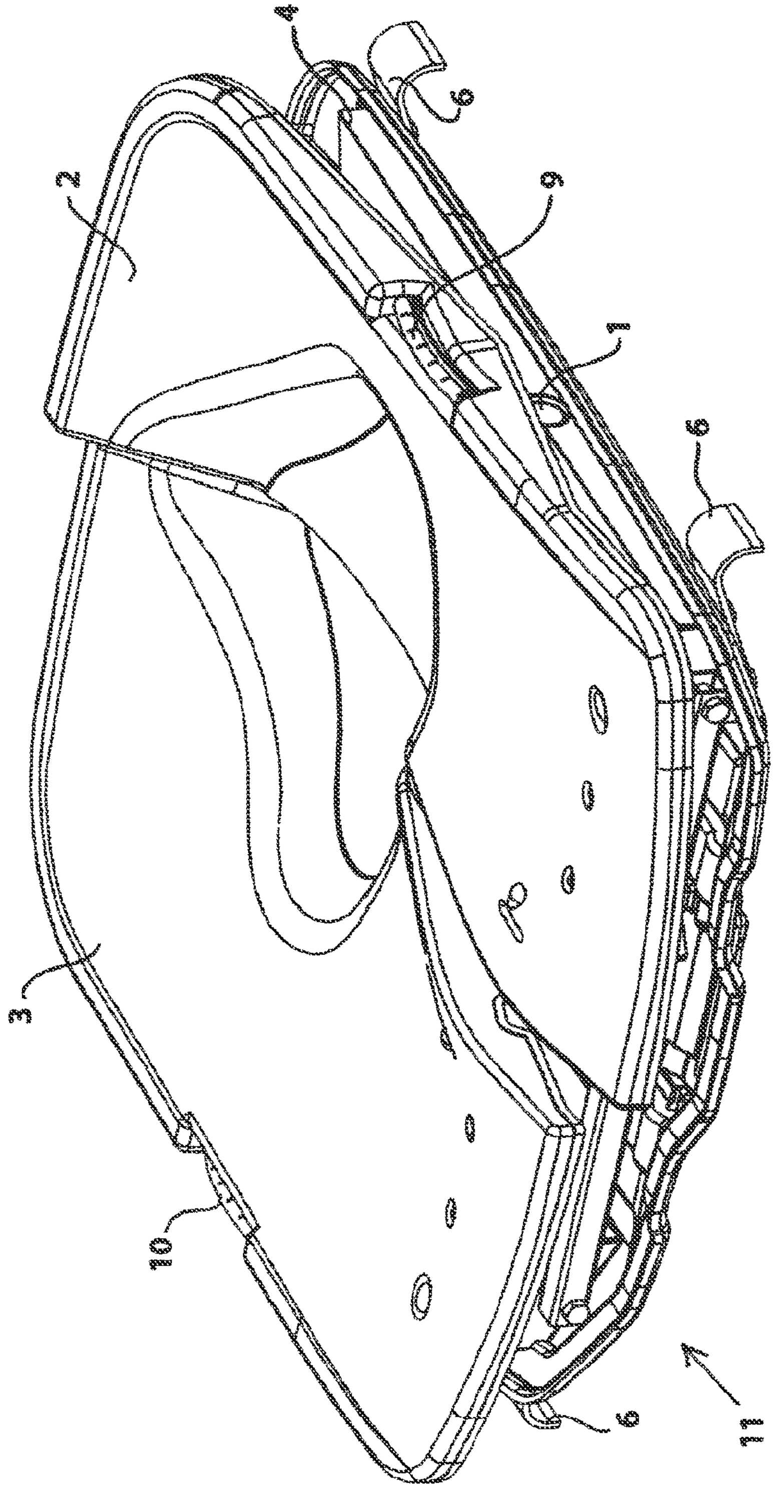
FIG. 1 shows a perspective view of an exemplary embodiment of the seat according to the invention.
Figure 2:
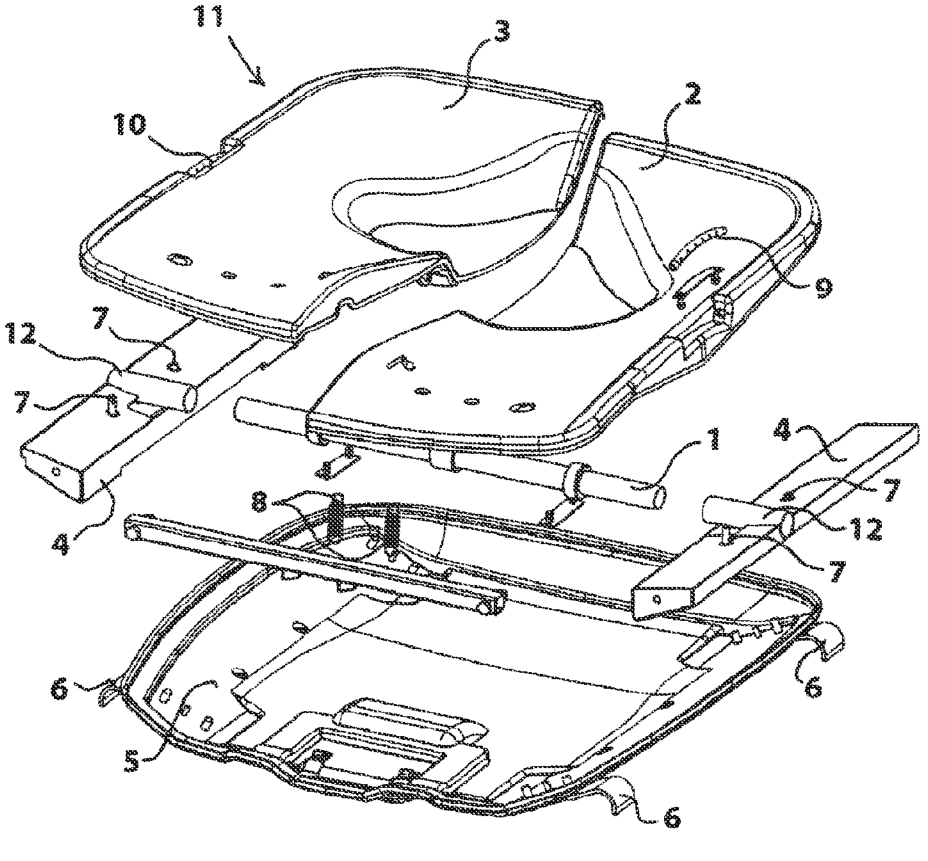
FIG. 2 shows an exploded view of the seat according to FIG. 1.

FIGS. 1 and 2 show a seat 11 according to the invention. Seat 11 comprises a profiled bottom plate or shell 5 of for instance a rigid plastic, a bearing construction 4 supported thereby, a pivot shaft 1 which is carried thereby via bushes 12 and to which a left-hand seat part 2 and a right-hand seat part 3 are pivotally connected. In the shown situation the left-hand seat part 2 is pivoted further forward/downward than right-hand seat part 3.

The upper surfaces of seat parts 2 and 3 have an anatomical form.

It is noted that the pressure-distributing layers and cover layer to be further described below are not shown in FIGS. 1 and 2 for the sake of clarity.

Bottom plate 5 carries on its four corner points outward protruding hooks 6 for coupling to for instance the frame of a chair or a wheelchair.

In this exemplary embodiment frames 4 comprise adjustable fixation means 7 for securing or bounding the pivoting range of seat parts 2 and/or 3.

Figure 6:
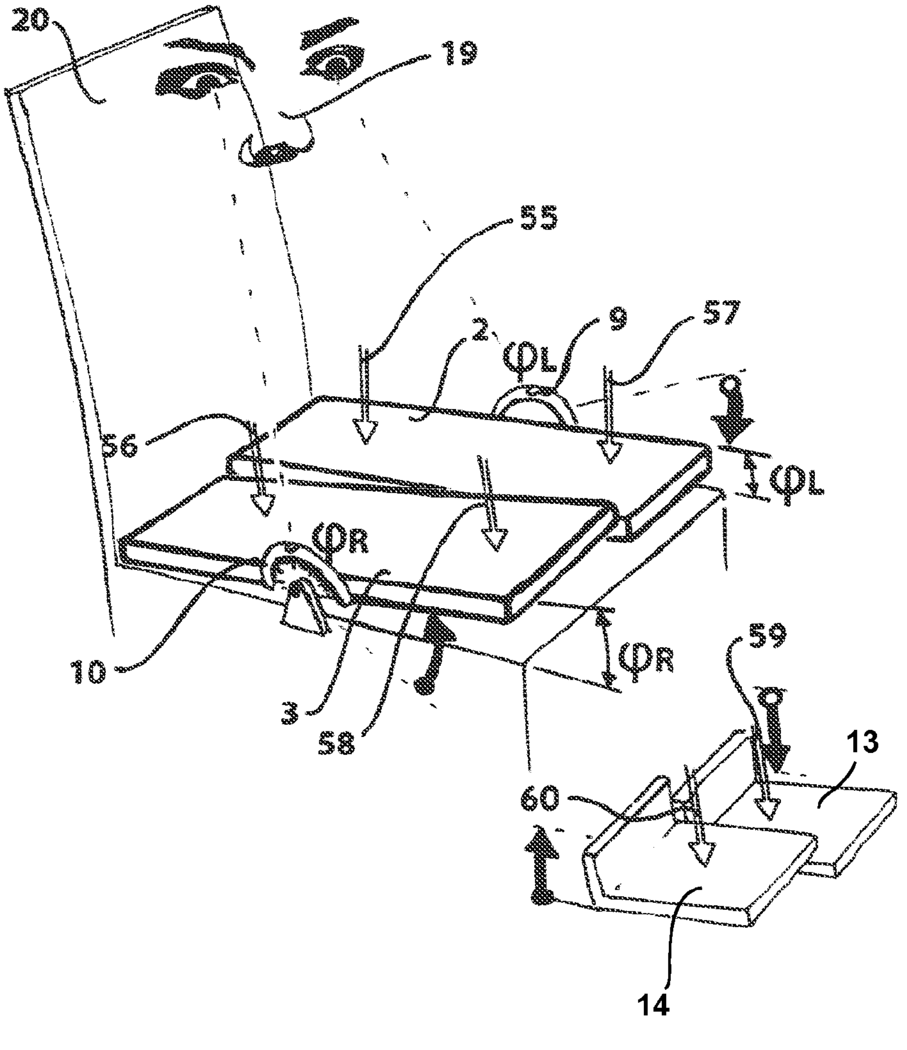
FIG. 6 shows a highly simplified, perspective view of the seat according to the invention, wherein the seat parts are provided with angle measuring devices and the chair comprises footrests and a back support.

The sitting comfort of a seated person 19 depends, among other factors, on the height adjustment of footrests 13, 14, of which only the left-hand footrest 13 is drawn in FIG. 3. Referring to FIG. 6, it is noted here that, as well as seat parts 2, 3, footrests 13, 14 are also separated from each other in this exemplary embodiment. The right-hand footrest is designated with reference numeral 14.

Figures 3A, 3B, 3C:
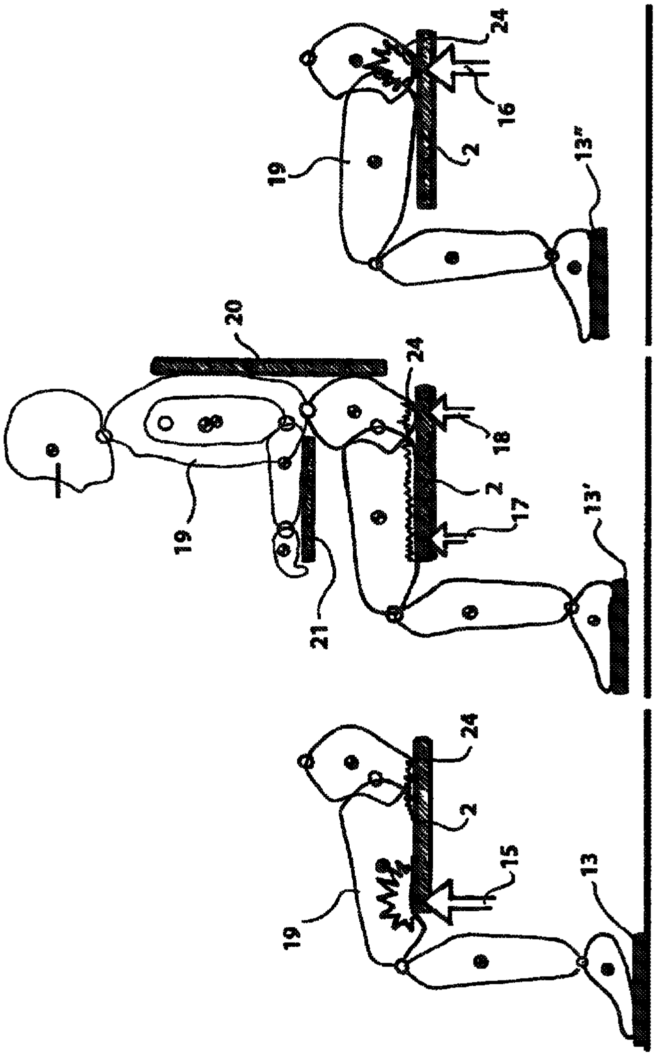
FIGS. 3*a*, 3*b* and 3*c* show highly schematic side views of a seat according to the invention in combination with a footrest, wherein the footrest is set too low in FIG. 3*a*, set correctly in FIG. 3*b* and set too high in FIG. 3*c*.

In the situation according to FIG. 3*a* footrest 13 is set too low, which has the result that the pressure on the front side of the upper leg indicated with an arrow 15 is concentrated locally and is relatively great.

In the situation according to FIG. 3*c* footrest 13" is set too high, which has the result that the pressure is concentrated as according to arrow 16 in the vicinity of the relevant tuber 24.

In the intermediate position according to FIG. 3*b*, in which the footrest is set correctly, the pressure forces indicated symbolically with arrows 17, 18 are properly distributed over the whole supporting length of the upper leg and the buttocks.

FIGS. 3*a* and 3*c* show only a part of the seated person 19, while FIG. 3*b* shows the whole person 19, albeit very schematically. Attention is also drawn to the fact that in the situation shown in FIG. 3*b* (which corresponds to that according to FIGS. 3*a* and 3*c*) the person 19 is supported in the back by a backrest 20, and can rest his left lower arm on a left-hand armrest 21.

The situations according to FIGS. 3*a* and 3*c* can result in discomfort, restriction and even decubitus. The correct foot support according to FIG. 3*b* provides for a correct distribution of forces and correspondingly small pressure on the bottom area of user 19, and thereby reduces the peak pressures, whereby discomfort is reduced substantially and the risk of decubitus accordingly reduced.

Figure 4:
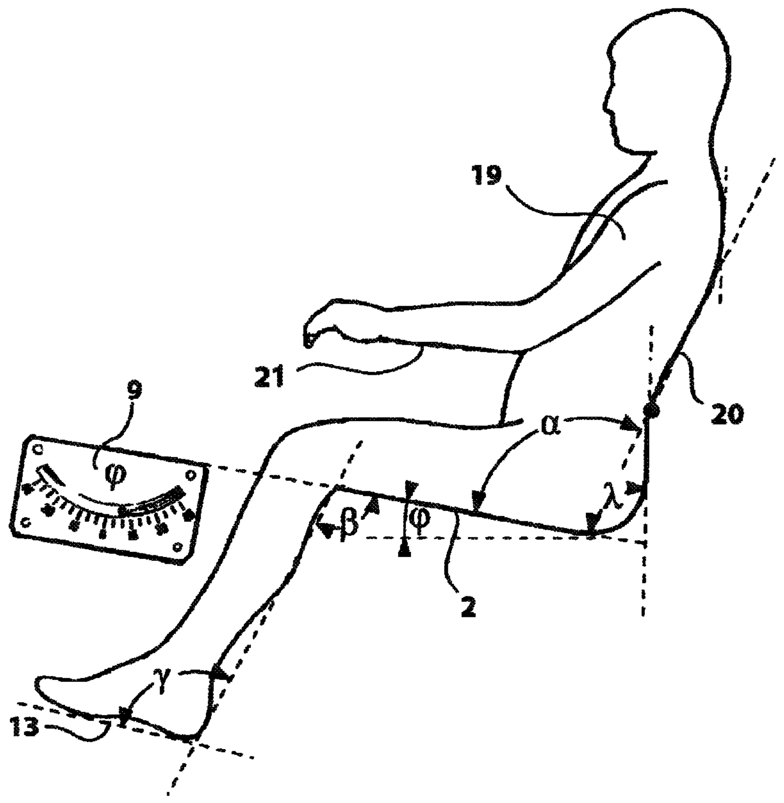
FIG. 4 shows a schematic side view of a seat in combination with a backrest and a seated person for the purpose of elucidating the relevant angles.

FIG. 4 shows a seated person 19, wherein relevant measurable postural angles are shown on the human body. Particularly important in the context of the invention is the seat angle $\phi$, which can be measured on the left with the left-hand angle measuring device 9 and on the right can be measured with the right-hand angle measuring device 10.

Figures 5A, 5B:
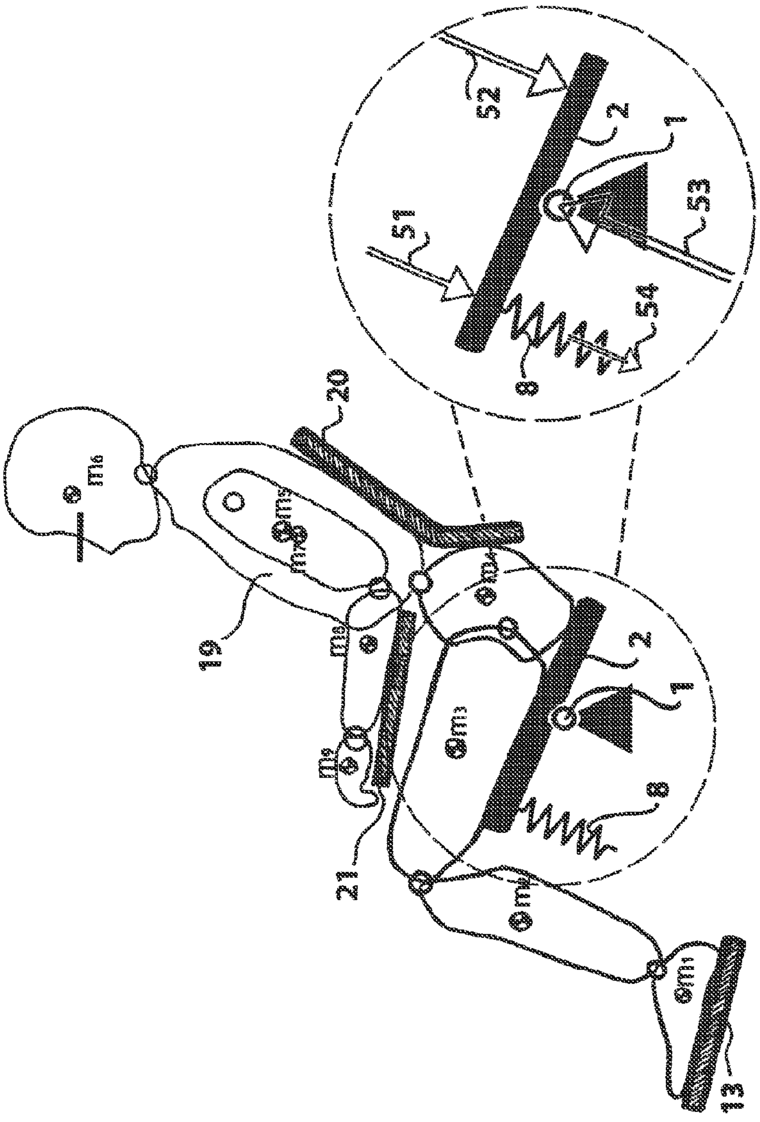
FIG. 5*a* shows a model of the human body in the manner of FIG. 3 in accordance with the mentioned book "Zo zit net!" by dr. ir. H. A. M. Staarink, placed on the seat according to the invention and provided with the correct back, arm and foot supports.
FIG. 5*b* shows a side view of the seat according to FIG. 5*a* in which the relevant forces are drawn.

Backrest 20 has in FIG. 4, as also in FIGS. 5*a* and 5*b*, a form differing from backrest 20 according to FIG. 3*b*, although this aspect is not relevant within the context of the present invention.

FIG. 5*a* shows a model of the human body as developed by dr. ir. H. A. M. Staarink in his above discussed book “Zo zit het!”. The model is chosen such that feet, lower legs, upper legs, pelvis, torso, head, upper arms, lower arms and hands are represented as non-deformable elements with respective mass centres m1-m9. The body parts of the model are connected to each other by means of hinges. In the view of FIG. 5*a* the seated person 19 is supported by seat 2, backrest 20, footrest 13 and armrest 21. Said mass centres m1-m9 each have their own resultant gravitational force.

Two draw springs 8 (see also FIG. 2) pull the front sides of left-hand seat part 2 and right-hand seat part 3 downward to a rest position.

FIG. 5*b* shows the forces exerted on seat part 2 by the seated person 19. The forces F-LEG and F-TUBER are at least substantially frictionless in that the seat angle $\phi$ has a value of about 12°. This has been demonstrated experimentally in a study reported in the above cited reference by dr. ir. H. A. M. Staarink, The force on the F-AXIS is the resultant normal force. The total of the forces and the moments of force will be in equilibrium if no angular rotation and no angular acceleration take place.

As already described, in non-loaded situation the force F-SPRING exerted by spring 8 will cause seat part 2 to pivot forward/downward.

It will be apparent that seat 2, 3 according to the invention has a symmetrical structure and that the descriptions given on the basis of left-hand seat part 2 therefore also apply to right-hand seat part 3.

FIG. 6 shows that a change in the height of left-hand footrest 13 and right-hand footrest 14 causes a change in $\phi_L$ and/or $\phi_R$, and thus also a change in F-TUBER, L and F-TUBER, R. An individual optimal adjustment can be realized by adjusting footrests 13, 14. These adjustments can differ from each other as a result of anthropometric and individual size differences.

Angle measuring devices 9 and 10 give user 19 and/or the therapist information relating to the current seat angles $\phi_L$ and/or $\phi_R$.

The force F-LEG, L exerted by the left leg is designated with the reference numeral 57, the force F-LEG, R exerted by the right leg with 58, the force F-FEET, L exerted by the left foot with 59 and the force F-FEET, R exerted by the right foot with 60. L means “left” and R means “right’.

Figure 7A:
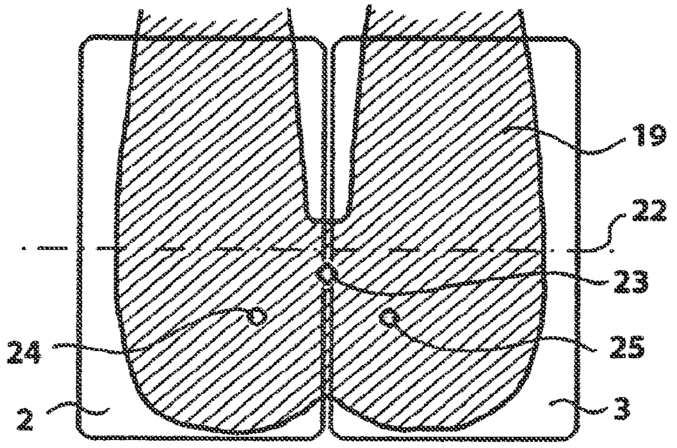
FIG. 7*a* is a schematic top view of a seat according to the invention, wherein prominent zones of the seated person are drawn.

FIG. 7*a* shows that the force F-TUBER, R on the right-hand tuber is decreased by pivoting right-hand seat part 3 further backward than left-hand seat part 2 while increasing $\phi_R$.

In FIG. 7*a* the pivot axis defined by pivot shaft 1 is designated with reference numeral 22. In this embodiment this axis is collinear for both seat parts 2 and 3.

In FIG. 7*a* the centre of pressure is designated 23, left-hand tuber 24 and right-hand tuber 25.

Figure 7B:
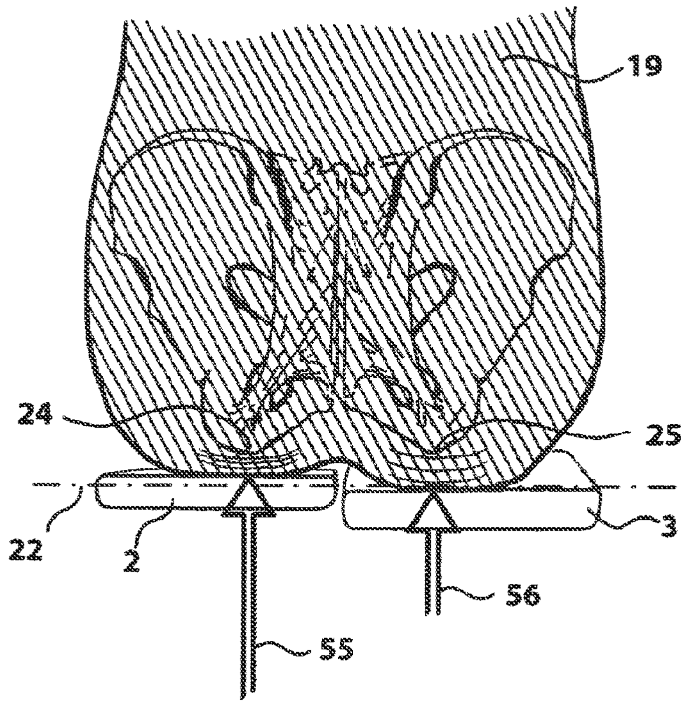
FIG. 7*b* is a rear view of the seat according to FIG. 7*a;*

FIG. 7*b* shows the effect of the mutually differing pivot positions of seat parts 2 and 3.

It will be apparent that the tissue under left-hand tuber 24 is further compressed than the tissue under right-hand tuber 25. Given a specific condition of the person 19, this may be a desired setting of seat parts 2 and 3.

Figure 8:
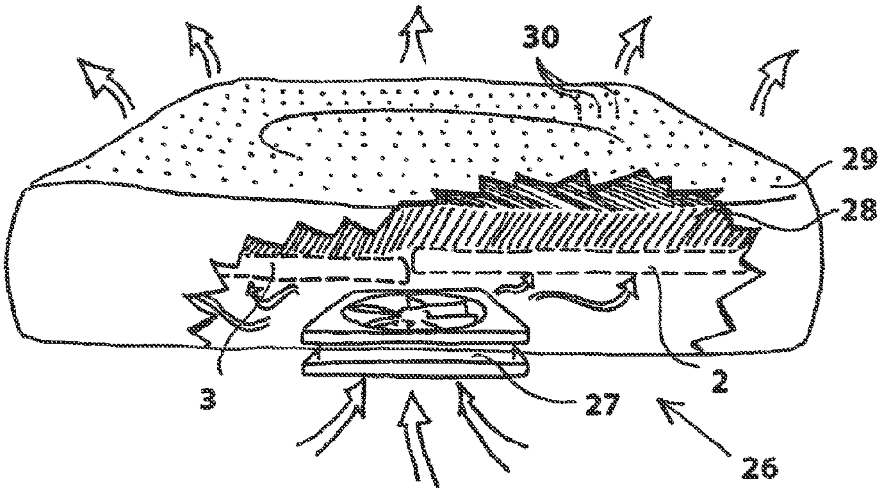
FIG. 8 is a cut-away perspective view of a seat with a fan.

FIG. 8 shows a seat part 26 to which a fan 27 is added. A pressure-distributing upper layer 28 is air-permeable and is covered by a breathing cover layer 29. The fan carries air under a certain pressure toward pressure-distributing upper layer 28, this air leaving upper layer 28 via perforations 30 present in the breathing cover layer 29.

Figure 9A:
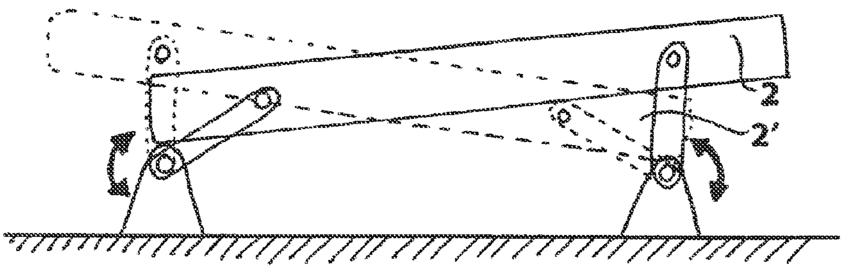
FIG. 9*a* is a schematic side view of a seat part which is pivotable by means of rods.
Figure 9B:
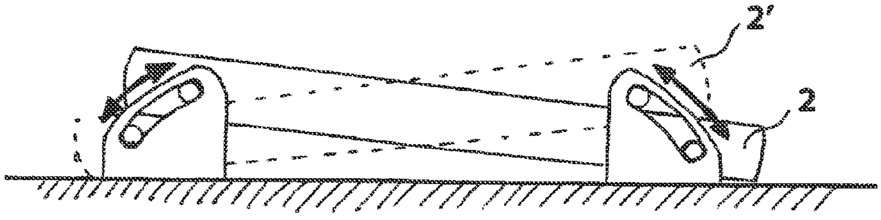
FIG. 9*b* shows a view corresponding to FIG. 9*a* of a variant in which a seat part is guided along guide slots by means of pins, and is thus pivotable.

FIGS. 9*a* and 9*b* show that the pivoting of a seat part can take place in a manner other than via a pure and simple hinge displacement.

FIG. 9*a* shows that a seat part 2 can pivot to for instance position 2' in the manner according to the invention by means of a rod mechanism.

FIG. 9*b* shows that the pivoting can also take place by having a seat part 2 guided to position 2 in two paths by pins in guide slots.

What is claimed is:

1. Seat for supporting a bottom area of a seated person, which seat is part of an article of seating furniture or a means of transport, the seat comprising:
- seat parts including a left-hand seat part and a right-hand seat part wherein the seat parts are separated from each other along a nominal median plane and include a rearward buttock end;
- each of the seat parts independently pivotable with respect to the other seat part and around a pivot zone extending at least roughly perpendicularly of said median plane;
- an adjustable footrest having a height that is selectively affixed relative to the pivot zone; and
- a projected position of the pivot zone lies forward of the buttock end and rearward of the adjustable footrest, wherein the seat parts do not include a biasing means rearward of the pivot zone and are freely movable.

2. Seat as claimed in claim 1, wherein both seat parts have an anatomical form.

3. Seat as claimed in claim 1, wherein both seat parts are provided with a pressure-distributing upper layer.

4. Seat as claimed in claim 1, wherein the adjustable footrest includes a left-hand footrest and a right-hand footrest.

5. Seat as claimed in claim 4, wherein each of the left-hand footrest and the right-hand footrest are independently adjustable with respect to the other footrest.

6. Seat as claimed in claim 1, comprising pivot position adjusting means for adjusting the pivot positions of the seat parts.

7. Seat as claimed in claim 6, wherein the pivot position adjusting means are of mechanical, pneumatic or electrical type.

8. Seat as claimed in claim 6, comprising fixation means for fixing at least one of the two seat parts in an adjusted pivot position.

9. Seat for supporting a bottom area of a seated person, which seat is part of an article of seating furniture or a means of transport, the seat comprising:
- two parts, including a left-hand seat part and a right-hand seat part, which seat parts are separated from each other along a nominal median plane and include a rearward buttock end;
- each of the seat parts is independently pivotable with respect to the other seat part around a pivot zone extending at least roughly perpendicularly of said median plane;
- a projected position of the pivot zone lies forward of the buttock end;
- pivot position adjusting means for adjusting the pivot positions of the seat parts, wherein the pivot position adjusting means are of mechanical, pneumatic or electrical type; and
- control means for controlling the pivot position adjusting means such that the pivot positions of the seat parts vary through time such that pressure loads on the buttock end vary through time.

10. Seat for supporting a bottom area of a seated person, which seat is part of an article of seating furniture or a means of transport, the seat comprising:
- seat parts including a left-hand seat part and a right-hand seat part wherein the seat parts are separated from each other along a nominal median plane and include a rearward buttock end;
- each of the seat parts independently pivotable with respect to the other seat part and around a pivot zone extending at least roughly perpendicularly of said median plane;
- an adjustable footrest having a height that is selectively affixed relative to the pivot zone; and
- a projected position of the pivot zone lies forward of the buttock end and rearward of the adjustable footrest;
- wherein both seat parts are provided with a pressure-distributing upper layer, and
- wherein the pressure-distributing upper layer is air-permeable, is covered by a cover layer provided with perforations, and air pressure means are present which feed air under a certain pressure to the pressure-distributing upper layer, this air leaving the upper layer via the perforations present in the cover layer.

11. Seat as claimed in claim 10, wherein the air pressure means is a fan.

12. Seat for supporting a bottom area of a seated person, which seat is part of an article of seating furniture or a means of transport, the seat comprising:
- two parts, including a left-hand seat part and a right-hand seat part, which seat parts are separated from each other along a nominal median plane and include a rearward buttock end;
- each of the seat parts is independently pivotable with respect to the other seat part around a pivot zone extending at least roughly perpendicularly of said median plane;
- a projected position of the pivot zone lies forward of the buttock end; and
- an angle measuring device added to at least one of the seat parts with which pivot positions of the at least one of the seat parts can be measured and read.

13. Seat as claimed in claim 12, wherein the pivot positions are measured and read by an angle measuring device that includes a spirit level.

14. Seat for supporting a bottom area of a seated person, which seat is part of an article of seating furniture or a means of transport, the seat comprising:
- seat parts including a left-hand seat part and a right-hand seat part wherein the seat parts are separated from each other along a nominal median plane and include a rearward buttock end;
- each of the seat parts independently pivotable with respect to the other seat part and around a pivot zone extending at least roughly perpendicularly of said median plane;
- wherein each of the seat parts includes a recess that is located at least partly rearward of the pivot zone and extends from an inner side of a corresponding seat part, wherein the recess has a predetermined distance from an inner periphery of the corresponding seat part and has a width decreasing in a rearward direction;

an adjustable footrest having a height that is selectively affixed relative to the pivot zone; and a projected position of the pivot zone lies forward of the buttock end and rearward of the adjustable footrest, wherein the seat parts are freely movable.

15. Seat as claimed in claim 14, wherein each of the seat parts includes an upward extending edge that extends forward from the recess and is located forward of the pivot zone.

* * * * *